Figure 3:
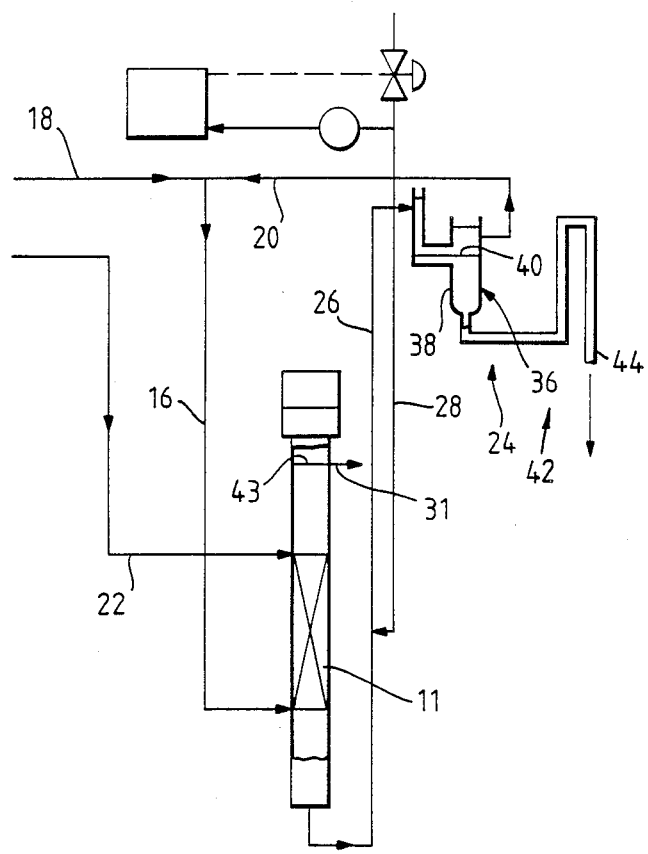

United States Patent [19]

Parker et al.

[11] Patent Number: 4,985,141
[45] Date of Patent: Jan. 15, 1991

[54] LIQUID-LIQUID CONTACTOR COLUMNS

[75] Inventors: Douglas E. Parker, Caterall; Dennis H. Logsdail, Icknield, both of United Kingdom

[73] Assignee: The Secretary of State for the United Kingdom Atomic Energy Authority in Her Britannic Majesty's Government of the United Kingdom of Great Britain and Northern Ireland, London, United Kingdom

[21] Appl. No.: 323,858

[22] Filed: Mar. 15, 1989

[30] Foreign Application Priority Data

Mar. 21, 1988 [GB] United Kingdom ................. 8806698
Jan. 26, 1989 [GB] United Kingdom ................. 8901739

[51] Int. Cl.$^5$ .............................................. B01D 11/04
[52] U.S. Cl. ..................................... 210/90; 210/105; 210/511; 422/257
[58] Field of Search ................... 210/103, 105, 85, 90, 210/634, 511; 585/415, 533; 261/114.3; 422/257

[56] References Cited

U.S. PATENT DOCUMENTS

| | | | |
|---|---|---|---|
| 4,133,714 | 1/1979 | Vorobiev et al. | 261/114.3 X |
| 4,340,542 | 7/1982 | Bar et al. | 544/369 X |
| 4,751,338 | 6/1988 | Tabak et al. | 585/533 X |
| 4,786,414 | 11/1988 | Priestley | 422/257 X |

Primary Examiner—Frank Spear
Attorney, Agent, or Firm—William R. Hinds

[57] ABSTRACT

A liquid-liquid contactor column 10 has a solvent input 16 and an aqueous phase input 22. Lighter phase liquid is discharged at 31 and heavier phase is moved by an air lift 26 to a receiver. The air supply line 28 to the air lift 26 includes valve 32 and a pressure sensing transducer 34 senses pressure in line 28 and sends electric signals to signal processing unit 52 which may for example close down operation of the column, or effect other changes to maintain operating characteristics of the column. The column could be pulsed by means which also send signals to unit 52, and could deliver to an external settler.

9 Claims, 4 Drawing Sheets

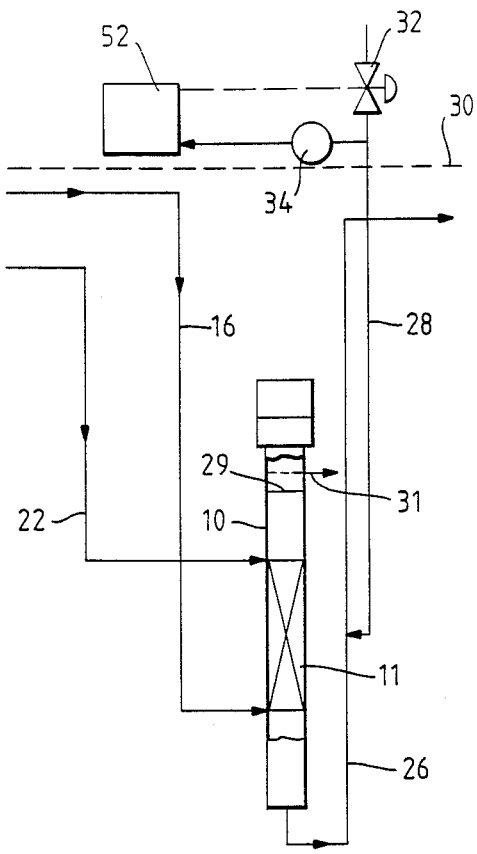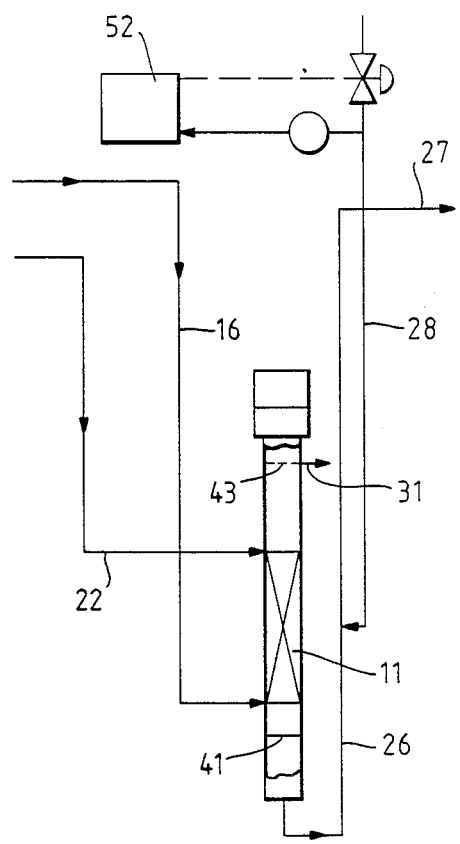

LIQUID-LIQUID CONTACTOR COLUMNS

This invention relates to liquid-liquid contactor columns.

One form of contactor is the pulsed column type in which the rate of mass transfer is enhanced by hydraulic pulsation of the liquids in the column through packing within the column, one liquid forming a continuous phase and the other a dispersed phase.

In one known design of pulsed column for use in situations where a solute-containing aqueous liquid (such as uranium/plutonium-bearing nitric acid) constitutes the dispersed phase and flows downwardly through the column for contact with a continuous phase constituted by a solvent extractant such as tri-n-butyl phosphate diluted with odourless kerosene, a phase-disengaging section, known as the settler, is located at the bottom of the column. To secure stable operation of the column and satisfactory mass transfer between the two phases, it is necessary to regulate the position of the liquid-liquid interface within the settler and consequently, to enable such regulation to be effected, the position of the interface has to be monitored. One method of monitoring for this purpose involves the use of pneumercators inserted into each phase for measuring differential pressure in the settler, and signal processing circuitry connected to the pneumercators. However, because the bottom settler is subject to the pulsating pressure head exerted by the column, accurate sensing of the interface is difficult and involves the use of complex electronics for performing the necessary signal processing. Moreover, the interface is not, in practice, a well-defined boundary—instead it comprises a dispersion band formed by an emulsion of the two phases.

It has previously been proposed to employ a separate or external settler instead of using a section of the pulsed column as the settler. In this instance, a mixture of the two liquid phases is pumped by an air-lift from the bottom of the column into a separate settler where they are separated, the separated lower density phase then being available for recycle to the column and the separated higher density phase being passed, via a lute, to subsequent process operations. With an external settler, the position of the liquid-liquid interface is essentially determined by substantially non-variable parameters, such as: the relative heights of the lower density phase off-take and the lute for the higher density phase; the densities of the two phases; their relative proportions in the dispersion band; and the flow resistances present. In practice, the parameters may be selected so that the interface lies at a substantially well-defined level and the interface remains in this position (in the absence of fault conditions) because any fluctuations in the flowrates of the liquids to the settler result in only slight changes in the relative heights of the separated liquids at the lute for the higher density phase and the off-take for the lower density phase.

In pulsed columns using an integral settler in situations where radioactive liquors are being handled, various parameters such as interface movement, total column height (and hence dispersed phase hold-up), pulsing amplitude and pulsing frequency can be monitored by means of a system of pneumercators.

According to this invention there is provided a liquid-liquid contactor column including air-lift means for lifting liquid from a lower part of the column, and having means for sensing the air pressure supplied to the air-lift means and providing electrical signals corresponding to the pressure. The air-lift need not be pulsed. When the column is pulsed, electrical means for processing said signals may discriminate between first signal components attributable to pulsing of the column and second signal components attributable to pulsing of the air-lift means.

The air-lift may deliver liquid from below a continuous phase inlet to a separate settler vessel.

As used herein, "air-lift means" is to be construed as covering the use of air or other gases to feed contents of the column to a receiver.

The electrical signal processing means may also be arranged to effect averaging of the electrical signals produced by sensing means. In practice, the average pressure prevailing in the air-supply line to the air-lift means is related to the dispersed phase hold-up prevailing within the column, i.e. average pressure increases generally linearly with column weight (which is a measure of dispersed phase hold-up).

The electronic signal processing means may comprise means for detecting variation of the first and/or second signal components, and means responsive to the detecting means for modifying operation of the column and/or the air-lift means in dependence upon such variations.

For example, if the detecting means detects a change in the amplitude of the first signal component (which change may be indicative of a change in the operational state of means for pulsing the column in the case where the column is a pulsed column), the modifying means may act on the column-pulsing means in such a way as to restore the amplitude of the first signal component to a predetermined value or a value lying within a predetermined range.

Similarly, if the detecting means detects a change in the frequency of the first signal component, then the modifying means may act on timing means associated with the column-pulsing means to restore the column pulsing frequency to a predetermined value or a value within a predetermined range.

In another instance, if the detecting means detects a change in the averaged output of the electrical processing means (indicating a change in the dispersed phase hold up), the modifying means may act to change the air supply to the air-lift means and thereby counteract the change in dispersed phase hold up.

In other circumstances, the modifying means may act to shut down operation of the column; for instance, if the first signal component is absent this is indicative of malfunction of the column-pulsing means and column operation may be shut down while the malfunction is rectified.

Figure 4:
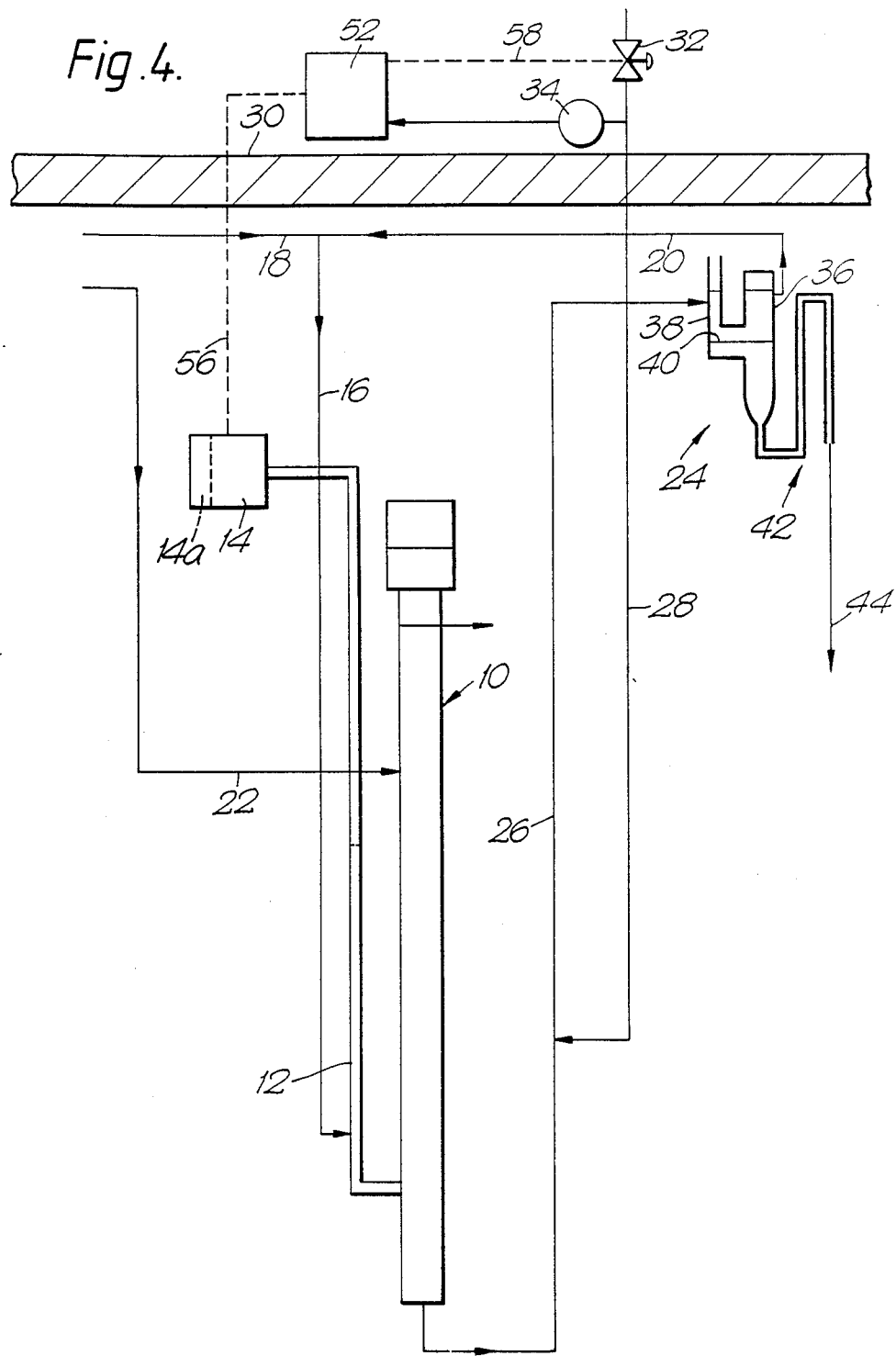
Figure 5:
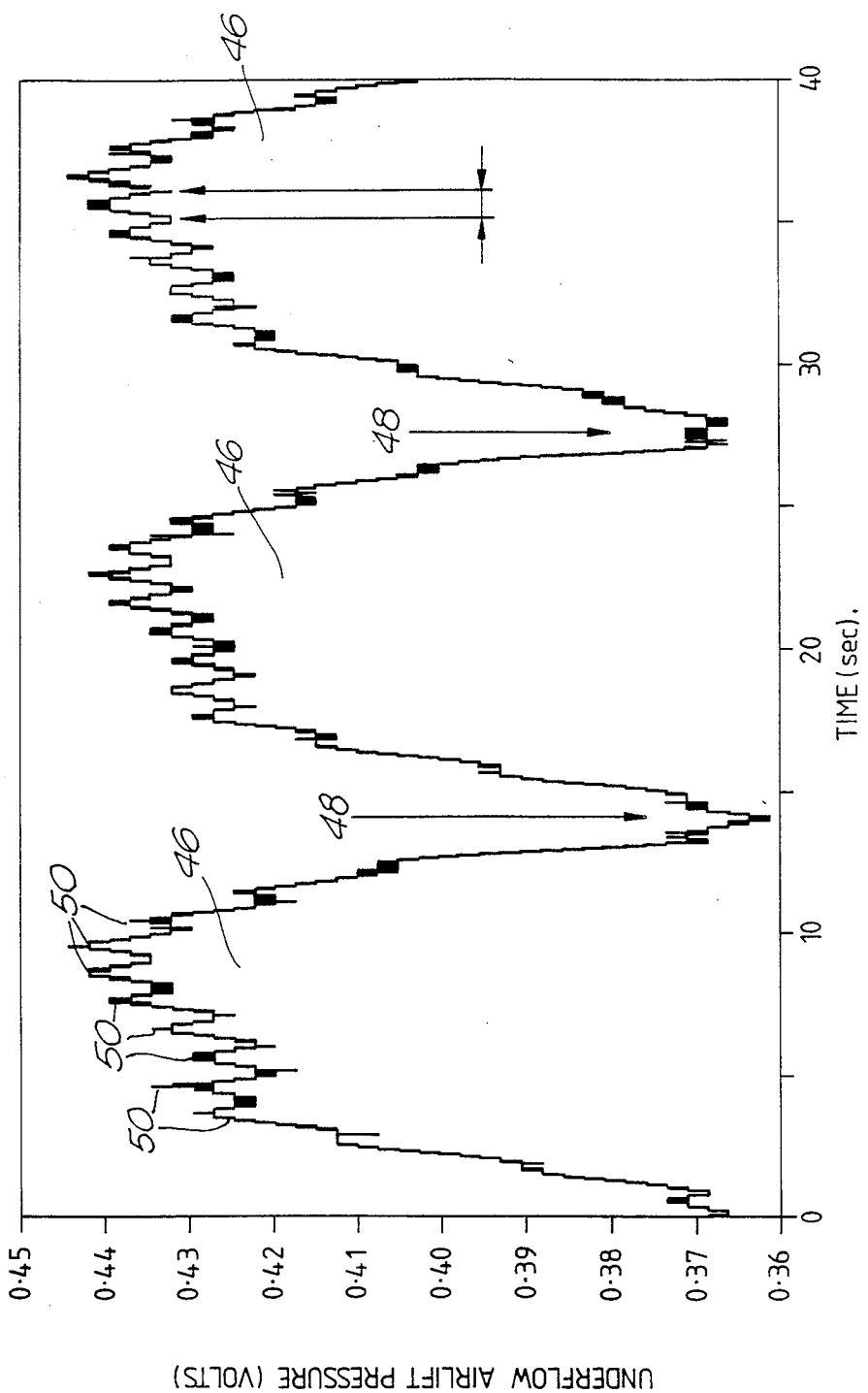

The invention may be performed in various ways and some specific embodiments with possible modifications will now be described by way of example with reference to the accompanying drawings, in which:

FIG. 1 shows an extractor column;
FIG. 2 shows another column;
FIG. 3 shows a column with external settler;
FIG. 4 shows a pulsed column; and
FIG. 5 shows a graph.

The invention is applicable to any form of liquid-liquid contactor column.

In the arrangement, operation of the column is monitored using the pressure in an air-lift riser of an air-lift, the air-lift being used to remove the heavier phase.

Referring to FIG. 1, the plant comprises a liquid-liquid contactor column 10 fitted in conventional manner with a large number of horizontally disposed perforated plates (or sieve plates) 11. The column 10 is supplied with an organic solvent phase via line 16. An aqueous phase is supplied to the column via line 22. Where the column forms part of a nuclear fuel reprocessing plant, the aqueous phase typically comprises nitric acid containing dissolved nuclear fuel and the solvent phase typically comprises tri-n-butyl phosphate in an odourless kerosene diluent. The column may be operated with the aqueous liquor as the dispersed phase.

Following thorough dispersion and mixing, with accompanying mass transfer of solute between the phases, the phases are withdrawn continuously from the column 10 with the heavier phase by means of air-lift limb 26 supplied with air via air supply line 28, and the lighter phase overflows through line 31. The plant, if employed for nuclear fuel reprocessing, is contained within shielding, part of which is depicted by reference numeral 30. The air supply line 28 passes through the shielding 30. Flow through the line 28 is controllable by a flow-controlling valve 32 and the pressure in the line 28 is sensed by a pressure transducer 34, both the valve 32 and the transducer 34 being located externally of the shielded containment cell.

The liquid-liquid interface for light phase dispersal is at 29 and the lighter phase (the solvent) is removed at 31. The heavier phase is removed by the air lift 26.

In operation, the air-lift action creates a series of air pockets within the air-lift limb 26 which transport slugs of the heavier phase to an external receiver, the slugs being delivered at regular intervals. FIG. 5 illustrates variation of the air pressure in air-supply line 28 as sensed by the transducer. It will be seen that the transducer output consists of a series of pulses 46 corresponding to build-up of the air pockets in the air-lift limb 26 followed by troughs 48 corresponding to the air pocket and slug travel up the limb. For a given air flow rate, set by valve 32, the troughs 48 occur at regular intervals. The pulses 46 as shown have a higher frequency oscillation superimposed thereon comprising a series of regularly-spaced peaks 50 referred to below. The peaks 50 are absent in operation of the FIG. 1 arrangement.

The output of the transducer 34 is fed to electronic processing instrumentation 52, which may be computer-based, for producing a record of the pressure variations occurring during operation of the plant. The instrumentation 52 serves to process the signals derived from the transducer 34 so as to determine the signal content attributable to the slugging action of the air-lift limb 26. In this way, malfunctions of the plant can be detected from a single signal obtained from a sensor 34 located externally of the shielding cell.

The instrumentation 52 may function as a controller for adjusting various control components of the plant in dependence upon the signal components present in the output of the pressure transducer. For instance, if the value of the transducer signal, after averaging by the instrumentation 52, deviates from a pre-set value, the latter may adjust the flow valve 32 via control line 58 to restore the averaged value of the transducer signal to a desired value or within a desired range.

The plates 11 can be replaced by other forms of packing, for example Raschig rings, Lessing rings, wire mesh, and can take the form of fixed material with sufficient voidage to allow flow of the liquids.

In FIG. 2, the liquid-liquid interface for heavy phase dispersal is at 41, the level of lighter phase (solvent) being at 43. In this case also slugs of heavier phase liquid are delivered at 27.

In FIG. 3, the lift 26 feeds an external settler 24 which comprises a settler vessel 36 provided with an air-disentrainment chamber 38 via which the mixed phases are fed to the vessel 36. Phase disengagement takes place in the settler, the interface between the two phases being indicated at 40. The lighter phase may be taken off via a recycle line 20 connecting with a main supply line 18 and with line 16, and the heavier phase e.g. aqueous raffinate being taken off via a lute arrangement 42 and line 44 for subsequent treatment.

FIG. 4 shows a pulsed column arrangement having similarity to FIG. 3. In this case the column is pulsed in known manner by a pulsing device 14 (including timer means 14a) which applies pulses of well-defined amplitude and frequency to the contents of the column through a pulsing limb 12. In this case the peaks 50 FIG. 5 are present and correspond to pulsing of the column i.e. the superimposed perturbation has a frequency and amplitude governed by the frequency and amplitude imparted to the column by the pulsing device 14. The signals on line 58 will include a component attributable to column pulsing.

In this case for example, if a blockage occurs between the column 10 and the air inlet point of the limb 26, the higher frequency component (i.e. peaks 50) will be absent and, in this event, automatic shut-down of the plant may be initiated. Also, the instrumentation 52 may include circuitry for monitoring the frequency and amplitude of the signal component corresponding to column pulsing so that, if the frequency and/or amplitude deviates from certain values or ranges, the controller 52 produces corrective signals on line 56 to effect adjustment of the pulsing device 14.

It will be understood that the columns of FIGS. 1 to 3 could be pulsed.

Thus, in any extraction or liquid-liquid contactor column an air-lift can be used to lift the more dense (heavy) phase from the base of the column to a product receiver and or another part of the process.

The pressure of the air in the air-lift riser can be used to monitor the total weight of the liquids in the column and hence the dispersed phase hold-up (DPHU). This in turn can be used to monitor the approach to flooding in the column since, as the flow-rates of the liquids fed to the column are increased, the DPHU increases. At some point the limiting flow-rates are reached and the column will flood.

The column can be monitored in this way regardless of whether the phase separating interface is at the top of the column, the base of the column or in an external settler, see FIGS. 1, 2, 3 and 4 respectively.

The instrumentation 52 may include electronic signal processing means arranged to average the electrical signals from the sensing means. The processing means may comprise means for detecting variation of the first and/or second signal components, and means responsive to the detecting means for modifying operation of the column and/or the air-lift means in dependence upon such variations. The detecting means and modifying means may act as indicated above.

We claim:

1. A liquid-liquid contactor column including air-lift means for lifting liquid from a lower part of the column to a liquid outlet, and means for sensing air pressure supplied to the air-lift means and for providing electrical signals responsive to the sensed pressure.

2. A column as claimed in claim 1, including electrical means for processing the signals.

3. A column as claimed in claim 2, in which the electrical means for processing the signals is arranged to effect averaging of the signals.

4. A liquid-liquid contactor column including air-lift means for lifting liquid from a lower part of the column to a liquid outlet, means for sensing air pressure supplied to the air-lift means and for providing electrical signals responsive to the sensed pressure, including means for pulsing the column, and electrical means for processing the signals, wherein the electrical means for processing the signals discriminates between first signal components attributable to pulsing of the column and second signal components attributable to pulsing of the air-lift means.

5. A column as claimed in claim 4, in which the signal processing means comprises means for detecting variation of the first and/or second signal components, and means responsive to the detecting means for modifying operation of the column and/or the air-lift means in dependence upon such variations.

6. A column as claimed in claim 5, constructed to operate such that if the detecting means detects a change in the amplitude of the first signal component, the modifying means acts on the column-pulsing means to restore the amplitude of the first signal component to a predetermined value or to a value lying within a predetermined range.

7. A column as claimed in claim 5, constructed to operate such that if the detecting means detects a change in the frequency of the first signal component, the modifying means acts on timing means associated with the column-pulsing means to restore the column pulsing frequency to a predetermined value or to a value within a predetermined range.

8. A column as claimed in claim 5, constructed to operate such that if the detecting means detects a change in the averaged output of the electrical processing means, the modifying means acts to change the air supply to the air-lift means to counteract change in dispersed phase hold-up.

9. A column as claimed in claim 5, in which the modifying means is adapted to shut down operation of the column.

* * * * *

UNITED STATES PATENT AND TRADEMARK OFFICE
CERTIFICATE OF CORRECTION

PATENT NO. : 4,985,141

DATED : January 15, 1991

INVENTOR(S) : Douglas E. Parker and Dennis H. Logsdail

It is certified that error appears in the above—identified patent and that said Letters Patent is hereby corrected as shown below:

On the title page of the printed patent, the information page, under the heading "[73] Assignee," the name of the assignee is corrected to read --UNITED KINGDOM ATOMIC ENERGY AUTHORITY--.

Signed and Sealed this

Twenty-first Day of April, 1992

Attest:

HARRY F. MANBECK, JR.

*Attesting Officer*    *Commissioner of Patents and Trademarks*